Sept. 5, 1950   R. V. NORTH   2,521,304
VEHICLE TURN INDICATOR SIGNAL
Filed Jan. 29, 1948   2 Sheets-Sheet 2
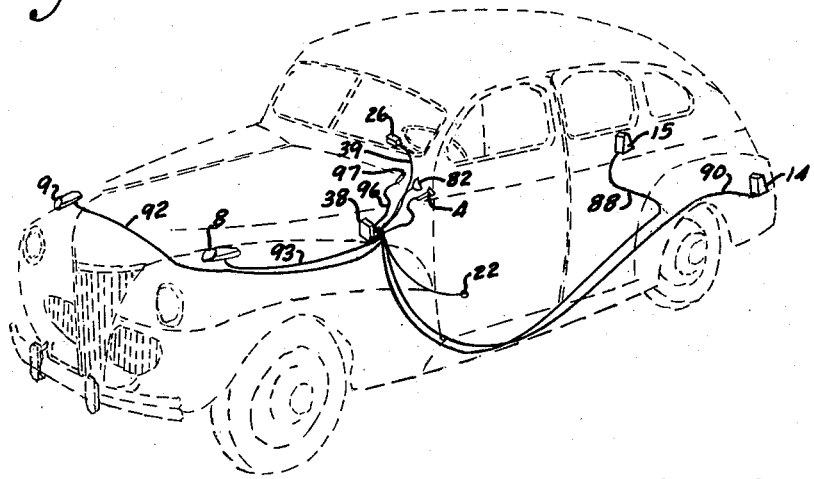
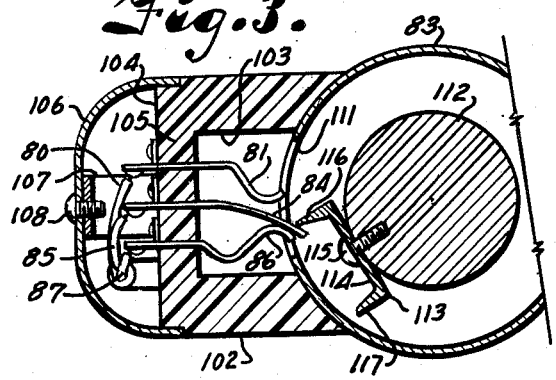
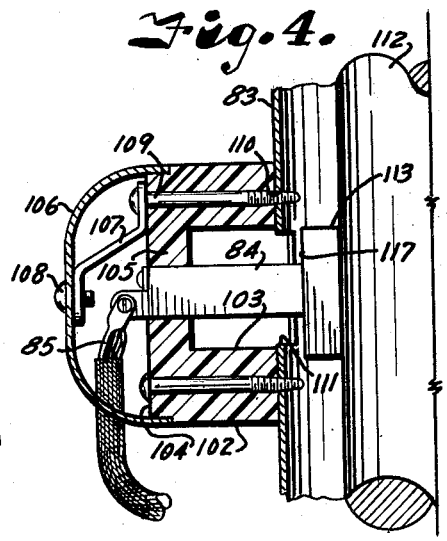
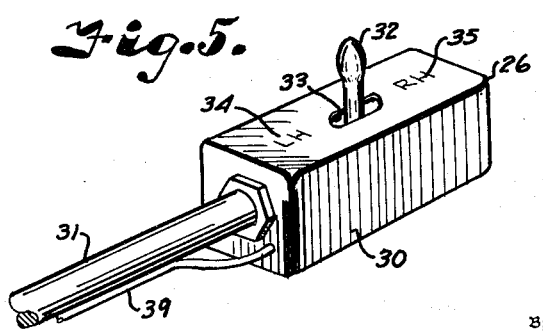
Inventor
Raymond V. North
By Fishburn & Mullendore
Attorneys Patented Sept. 5, 1950

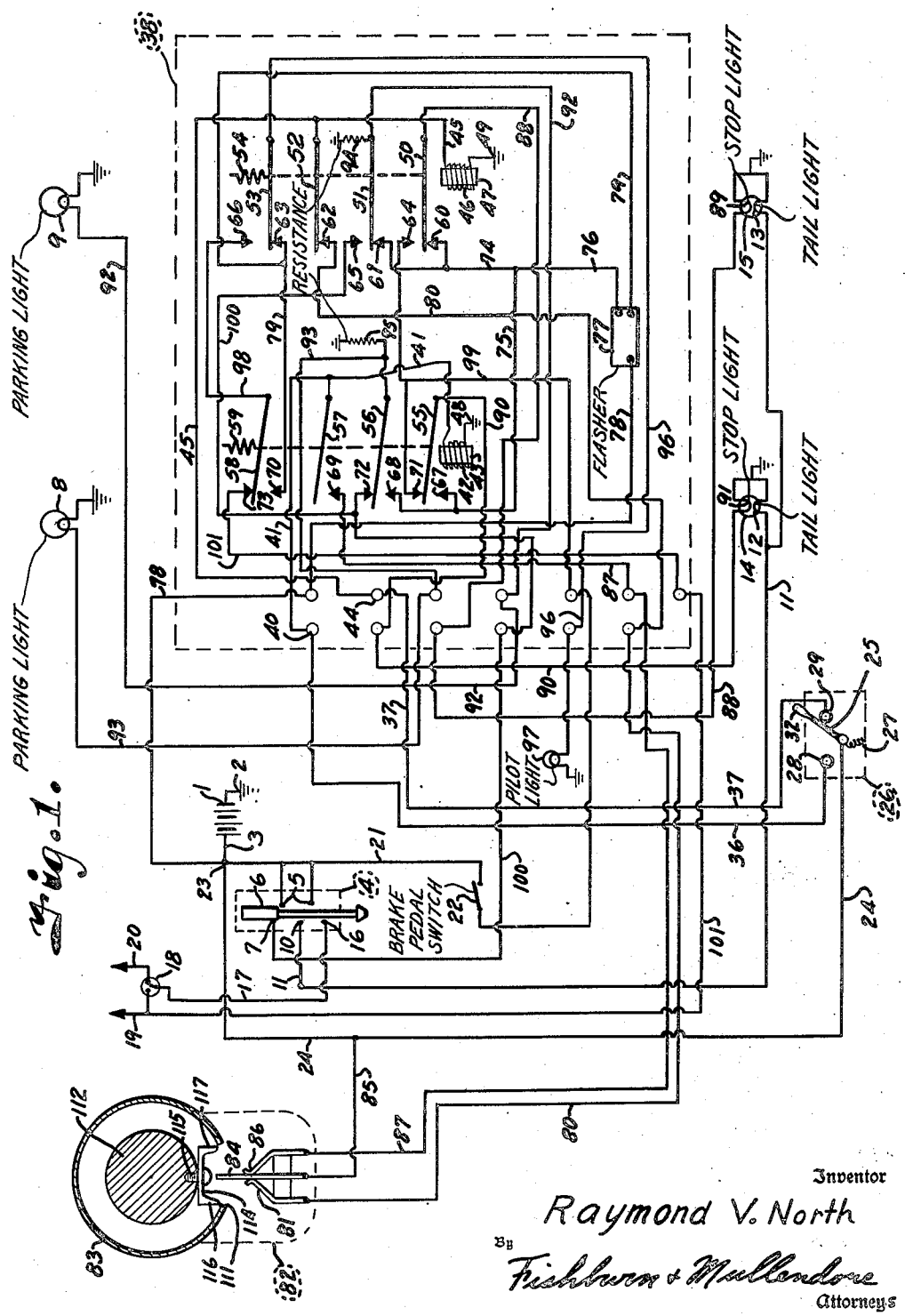

2,521,304

UNITED STATES PATENT OFFICE 2,521,304

VEHICLE TURN INDICATOR SIGNAL

Raymond V. North, Gashland, Mo.

Application January 29, 1948, Serial No. 4,979

3 Claims. (Cl. 177—337)

This invention relates to vehicle turn indicating signals and more particularly to improved signal circuits and switches for energizing turn signal lights and automatically de-energizing same after a turn is completed.

The objects of the present invention are to provide a vehicle turn signal system in which the signal lights may be the regular lights, usually provided, such as parking lights, on the front, and stop lights on the rear of a vehicle, and said system so arranged that the regular lights still perform the usual function for which they were designed; to provide a turn signal system which may be easily applied as original or accessory equipment and utilize regular equipment usually on the vehicle with a minimum of additional equipment and wiring; to provide a turn signal system which can be manually set in operation before a turn is made and which is automatically deenergized by starting a turn of the vehicle in the opposite direction to that intended or by the vehicle commencing to assume a straight course after the intended turn is completed; to provide a visual signal in the vehicle for informing the operator when the turn signals are energized, said signal preferably being the usual highway light indicator; to provide a turn signal system in which the operating devices are small, inconspicuous, easily manipulated, and do not interfere with normal driving operations; to provide a signal system in which two relays are utilized for controlling the four signal lights, said relay circuits being enclosed in a suitable box located under the hood or other out-of-the-way location in a vehicle; to provide a momentary on position switch on the gear shift lever or other location convenient to the driver for initial manual operation in starting the energization of the signal lights for an intended turn to the right or left without removing the hands from the steering wheel; to provide a switch structure including a cam on the steering shaft or other movable part of the steering mechanism of the automobile whereby movement of the steering shaft to turn in the direction signalled does not interrupt said signals, but turning the steering shaft in the opposite direction to that signalled deenergizes the signal circuit; and to provide a simple, efficient, economical turn signal apparatus requiring only the momentary actuating of a switch by the operator for correctly signalling an intended turn of the vehicle.

In accomplishing these and other objects of the present invention, I have provided improved details of structure, the preferred forms of which are illustrated in the accompanying drawings, wherein:

Fig. 1 is a diagrammatic view of the complete signal system arranged in accordance with my invention.

Fig. 2 is a perspective view illustrating the wiring necessary for installing the signal in a vehicle.

Fig. 3 is a transverse sectional view through the steering post and automatic return switch, the steering shaft being in slightly turned position.

Fig. 4 is a longitudinal sectional view through the steering post and automatic return switch.

Fig. 5 is a detailed perspective view of the momentary control switch located on the end of the shift lever.

Referring more in detail to the drawings:

1 designates a storage battery usually provided as standard equipment in automobiles and having one terminal grounded as at 2 and the other terminal connected by the usual conductor 3 to a conventional light switch indicated by the dotted lines 4. The light switch has conventional positive contacts 5 adapted to be engaged by a switch element 6 for completing a circuit from the contacts 5 to contacts 7 usually connected to parking lights 8 and 9 on the forward portion of an automobile. Contact 10 is connected by a conductor 11 with the elements 12 and 13 of combination stops and tail lights 14 and 15 mounted on the left and right side at the rear of said automobile. The switch also includes a contact 16 connected by a conductor 17 with a conventional headlight control switch 18 having conductors 19 and 20 leading to the highway and city driving filaments respectively of the headlights (not shown). The conventional wiring also includes a conductor 21 carrying battery current to the stop light switch 22 actuated by suitable connection with the foot brake apparatus of said automobile. This is all conventional equipment in the electrical circuit of an automobile which the present simplified signal system advantageously utilizes to provide an efficient turn signal with a minimum of equipment.

Leading from a convenient connection 23 of the usual battery circuit is a conductor 24 connected to the switch element 25 of a momentary switch indicated by the dotted lines 26, said switch element preferably having a suitable spring 27 adapted to return the switch element to the center "off" position when pressure is released therefrom. The switch 26 has two contacts 28 and 29 connected with circuits for controlling the left-hand and right-hand turn signals respectively. The switch 26 is preferably contained in a suitably shaped housing 30 adapted to be mounted on the steering post, steering wheel or other suitable location such as the end of the conventional gear shift lever 31 such as is mounted on the usual steering post, the housing 30 replacing the gear shift lever knob and serving therefor in the shifting of gears. The switch preferably is of the toggle type having a lever 32 projecting through an opening 33 in said housing and to a convenient position for operation by the driver without removing the hand from the steering wheel. The housing 30 may be provided with suitable indicia as at 34 and 35 for indicating the direction of movement of the toggle lever for signalling the respective left and right-hand turns; however, it is preferable that the lever be arranged whereby movement thereof to the left signals a left-hand turn and movement to the right signals a right-hand turn.

The contacts 28 and 29 are connected by conductors 36 and 37 to relay circuits in a control box 38, indicated by the large dotted rectangle in Fig. 1, said conductors preferably being arranged in a conduit 39 which may be conveniently arranged on the gear shift lever 31 and steering post whereby the control box may be mounted under the instrument panel or on the dash or other suitable location and not interfere with the operation of the automobile or convenience of the persons therein.

The conductor 36 leads to a suitable connection 40 in the control box 38, the connection 40 being provided with a conductor 41 leading to the relay coil 42 wound on a core 43. The conductor 37 leads to a connector 44 in the control box, said connection having a conductor 45 leading to the relay coil 46 wound on a core 47. The other ends of the coils 42 and 43 are preferably grounded as at 48 and 49 respectively.

When the switch element 25 is moved to the right as shown in Fig. 1 to complete the circuit with the contact 29, current flows through the relay coil 46 to energize same and move the connected switch elements 50, 51, 52, and 53 against tension of a suitable spring 54. Movement of the switch element 25 to the left energizes the relay coil 42 whereby the relay moves the switch elements 55, 56, 57, and 58 against tension of a suitable spring 59. The respective switch elements are so arranged that energization of the relay coil 46 moves the switch elements 50, 51, 52, and 53 into engagement with contacts 60, 61, 62, and 63 and de-energization of the relay coil permits the spring 54 to return the switch elements to normal position wherein the elements 50, 51, and 53 engage contacts 64, 65, and 66, the switch element 52 being disengaged from any contact. In the same manner energization of the relay coil 42 draws the switch elements 55, 56, 57, and 58 into engagement with contacts 67, 68, 69, and 70 respectively and de-energization of said coil permits the spring 59 to move the switch elements 55, 56, and 58 into engagement with contacts 71, 72, and 73 respectively, the switch element 57 being disengaged from any contact as shown in Fig. 1.

The switch contacts 60, 61 and contacts 67 and 68 are connected by branch conductors 74 and 75 respectively with a common conductor 76 leading to the outlet connection of a flasher unit 77, the flasher unit being of conventional design, having its inlets connected by a conductor 78 with the battery circuit, as at 23. Another outlet terminal of the flasher unit is connected by means of a conductor 79 with the switch contacts 63 and 70. The contact 62 is connected by a conductor 80 to the contact 81 located in an automatic return switch 82 suitably mounted for actuation by the steering mechanism, for example, on the steering column 83 as later described. The contact 81 is preferably a flat spring bent to engage one side of an intermediate contact 84 connected by a conductor 85 with the battery circuit, for example, with the conductor 24. The contact 84 is also of flat spring material that is engaged on the opposite side by a contact 86 of flat spring material which is connected by a conductor 87 with the switch contact 69.

The switch element 50 is connected by a conductor 88 with the filament 89 which normally serves as a stop light filament in the light 15 on the right rear of the automobile. The element 55 is connected by a conductor 90 with the filament 91 normally serving as the stop light element in the light 14 at the left rear of the automobile. The switch element 51 is connected by a conductor 92 with the parking light or other suitable signal light 9 at the right front of the automobile and the switch element 56 is connected by a conductor 93 with the filament of the parking light 8 at the left front of the automobile. Grounded resistors 94 and 95 may be connected into the conductors 92 and 93 if the current flow required for the flasher unit necessitates same. The switch element 52 is connected to the conductor 45 and the switch element 57 is connected to the conductor 41. The switch element 53 is connected by a conductor 96 with the highway light indicator bulb 97 usually mounted on the instrument panel of a vehicle for indicating when the highway lights are energized. The switch element 58 is connected by a conductor 98 with the switch contact 66. The switch contacts 64 and 71 are connected by a conductor 99 and branches therefor with the stop light switch 22. Contacts 65 and 72 are connected by a conductor 100 with the contact 7 to the light switch 4. The switch contact 73 is connected by a conductor 101 to the conductor 19 connected with the highway contact of the headlight control switch 18.

The switch contacts 81, 84, and 86 are suitably mounted in a return switch body 102 as shown in Figs. 3 and 4. The body is preferably of nonconductive material such as a suitable plastic and is provided with a recess 103 which terminates short of the outer end 104 of said body member to provide a wall 105 through which the contacts extend, the outer ends of said contacts being connected to conductors 80, 85, and 87 respectively, the connections being enclosed by a suitable cap 106 secured to a bracket 107 by a suitable fastening device 108. The opposite end of the bracket 107 is held in assembled condition with the body 102 by means of a suitable fastening device 109 which extends through the side walls of the body member and into a suitable aperture 110 in the steering column 83. The column 83 is provided with an opening 111 in alignment with the recess 103 and the contact 84 so arranged as to project through the opening 111 into the interior of said steering column, the contacts 81 and 86 being of such length that the ends thereof terminate adjacent the steering column wall and do not project therein.

Mounted on the steering shaft 112 is a cam member 113 consisting of a web member 114 secured to said shaft by suitable fastening devices 115, the web terminating in outwardly directed flanges 116 and 117 which extend outwardly toward the wall of the steering column, clearance being provided between the ends of said flanges and said wall whereby the cam does not interefere with rotation of the shaft inside of the steering column. The cam may be of a non-conducting material or insulated from the shaft 112, whereby the circuits will not be grounded when the cam engages the contact 84. As shown in Fig. 1 and Fig. 3, rotation of the shaft 112 moves the flanges 116 and 117 into engagement with the intermediate contact 84 to move same to the right or left depending upon the direction of rotation of said shaft in turning the vehicle, and as shown in Fig. 3, the contacts 81 and 86 are formed in such manner that rotation of the shaft 112 in a counterclockwise direction, as when making a left turn, will move the intermediate contact 84 out of engagement with the contact 81 and maintain engagement with the contact 86, while rotation in a clockwise direction will move the intermediate contact out of engagement with the contact 86 and maintain engagement with the contact 81.

In operating a signal system constructed and assembled in an automobile in the manner described, and assuming that the vehicle is on a straight course with no turns being indicated, the switch elements 50, 51, and 53 will engage contacts 64, 65, and 66 respectively and the switch elements 55, 56, and 58 will engage contacts 71, 72, and 73 respectively. With this arrangement the light switch 4 may be operated in the usual manner to control the headlights, tail lights and parking lights. If the switch element 6 is moved to energizes the parking lights and tail lights, current will flow from the battery 1 through the conductor 3, contact 5, contact 10, conductor 11 to the filaments 12 and 13 in the tail lights. Current will also flow through the contact 5, switch element 6, contact 7, conductor 100, contact 72, conductor 93, to the filament in the parking light 8, and through the contact 65, switch element 51 and conductor 92 to the filament in the parking light 9. If the highway lights in the headlights are being used, current flows from the light switch contact 16 through conductor 17, control switch 18, conductor 19, conductor 101, switch contact 73, switch element 58, conductor 98, switch contact 66, switch element 53, conductor 96, to the highway light indicator 97 on the instrument panel. If the brakes are applied, current flows through the conductor 21, switch 22, conductor 99, contacts 64 and 71, switch element 50 and 55, conductors 88 and 90 to the filaments 89 and 91 in the lights 15 and 14 at the rear of the vehicle. In other words, all of the lights including the stop light and highway indicator function in a normal manner.

When a turn is contemplated, for example, a right turn, the switch element 25 is moved to the right to engage the contact 29. Current then flows from the battery 1, through conductor 3, connection 23, conductor 24, switch element 25, contact 29, conductor 37, connection 44, conductor 45 to the relay coil 46, energizing said relay to draw the switch elements 50, 51, 52, and 53 into engagement with the contacts 60, 61, 62, and 63 respectively. The switch 26 is a momentary contact switch and when released moves to off position, but during the momentary contact the relay is operated including the switch elements and a circuit is completed from the battery through the conductor 24, conductor 85, switch element 84, contact 81, conductor 80, contact 62, switch element 52, conductor 45 to the relay coil 46, providing a holding current for the relay and maintaining the switches in position to provide a turn signal. Current then flows from the battery through the conductor 78 to the flasher unit 77, providing an intermittent current through the conductor 76, branch 74, contact 61, switch element 51, conductor 92, to the filaments in the right parking light 9, providing an intermittent or flashing light for indicating a contemplated right turn. Intermittent current also flows from the flasher unit 77 through the conductor 79, contact 63, switch element 53, conductor 96, to the highway indicator light 97 on the instrument panel. Current also flows through the contact 60, switch element 50, conductor 88, filament 89 in the light 15 at the right rear of the vehicle to give a flashing signal to the persons approaching the rear of the vehicle of the contemplated right turn. This signal continues until a turn is made. The lights are flashing an intended right turn; however, if the steering gear is turned to make a left turn, the shaft 112 is rotated in a counterclockwise direction moving the flange 116 of the cam 113 into engagement with the intermediate contact 84, moving same to the position shown in Fig. 3, breaking the engagement between the contact 84 and the contact 81 and breaking the circuit through the system to the relay coil 46. This releases all of the switch elements 50, 51, 52, and 53 and interrupts the flashing signal substantially at the start of the left turn. If the contemplated right turn is made, the shaft 112 is turned in a clockwise direction and the flange 117 of the cam 113 is moved into engagement with the intermediate contact 84, bending same to the left, Fig. 1, and maintaining engagement between the contact 84 and the contact 81. Such operation breaks the contact between the contact 84 and the contact 86 but as no current is flowing through that portion of the circuit there is no change in the signal being given. As the shaft 112 is rotated further, the flange 117 moves past the end of the contact 84 and releases same whereby it returns to a central position but engagement between contacts 81 and 84 is still maintained whereby the flashing signal is given while the right turn is being made. As the steering shaft 112 is rotated to straighten the course of the vehicle after completing the right turn, said shaft is rotated in a counterclockwise direction and the cam will engage the contact 84 breaking the circuit between the contacts 84 and 81 in the same manner as described in case a left turn were made while signalling a right-hand turn.

If the switch element 25 is moved into engagement with the contact 28 to signal a left-hand turn, the current flows from the battery through the conductor 24, switch element 25, contact 28, conductor 36, connection 40, conductor 41 to the relay coil 42, energizing same to move the switch elements 55, 56, 57 and 58 into contact with the contacts 67, 68, 69 and 70 respectively. This completes the circuit from the conductor 24, conductor 85, intermediate switch contact 84, contact 86, conductor 87, contact 69, switch element 57, conductor 41 to the coil 42 to provide a holding current for maintaining the signal operations until the steering mechanism is operated to make a turn. Current then flows from the battery through the conductor 78, flasher unit 77, conductor 76, conductor 75, contacts 67 and 68, switch elements 55 and 56, and conductors 90 and 93 to energize the filaments in the light 14 on the left rear of the vehicle and the parking light 8 at the left front of the vehicle, providing a flashing signal to indicate a left turn is contemplated. Intermittent current also flows through the conductor 79, contact 70, switch element 58, conductor 98, contact 66, switch element 53, conductor 96 to the highway light indicator 97 on the instrument panel providing a visual signal to notify the driver that the turn signal is operating, said signal being maintained until the steering apparatus is turned in either direction sufficiently to break the circuit in the reverse order to that described for the right turn signal.

In installing the present apparatus on a vehicle as accessory equipment, the usual wires leading to the parking lights and the stop lights are disconnected to discontinue the simultaneous operation of said lights and a new wire placed from the original junction to the connections of the control box whereby said lights operate individually. The switches 26 and 82 are installed and are connected by conductors with the control box, all other connections being made in the wiring circuit under the instrument panel; therefore, it is believed obvious that this signal may be easily installed either as original equipment or as an accessory, utilizing conventional lights of the vehicle to provide a simple, efficient turn indicating signal for a motor vehicle.

What I claim and desire to secure by Letters Patent is:

1. A vehicle system comprising, a vehicle having a steering mechanism, four regular equipment electric vehicle lights, one being mounted adjacent each fender of the vehicle, a source of current supply, circuits including current conductors connecting the current supply and lights, one circuit for the lights on each side of the vehicle, a visible signal in the vehicle arranged in parallel circuit with the lights, a signal control circuit, two way switches in the current conductors and normally positioned for current flow to all of said lights and selectively operable to connect the respective light circuits to the signal control circuit, electro-responsive devices for selectively actuating said switches, conductors in the signal control circuit connecting the current supply and electro-responsive devices, a normally open switch in the conductor for the electro-responsive devices, said switch being selectively operable to establish a current in the electro-responsive devices for actuating the respective switches in the conductors leading to the respective lights for energizing said lights to indicate a turn in the direction corresponding to the side of the vehicle on which the energized lights are located, a current interrupter flasher means in the conductor leading to the lights for intermittently interrupting the current thereto, a resistance in parallel circuit with the lights, holding circuits for maintaining current in the electro-responsive devices, a normally closed switch in said holding circuits, and a cam movable with the steering mechanism and engageable with the normally closed switch to operate same and interrupt the energized holding circuit only when the steering mechanism is turned in the direction opposite to that indicated by the signal, said interruption of the holding circuit discontinuing the current through the electro-responsive device and discontinuing the signal.

2. A vehicle signal system comprising, a vehicle having a steering mechanism, four regular equipment electric vehicle lights, one being mounted adjacent each fender of the vehicle, a highway beam signal light in the vehicle, a source of current supply, circuits including conventional switches, connections and conductors for simultaneously energizing the lights in the front of the vehicle, circuits including conventional switches, connections and conductors for simultaneously energizing the lights on the rear of the vehicle, a pair of relays, switches actuated by each relay interposed in said light circuits, means connected to said relays for normally maintaining the switches in condition for control of the light by the conventional switches, a normally open switch, current conductors connecting said source of current supply, normally open switch and relays, said normally open switch having two contacts, one being in the conductor connected to each relay whereby said normally open switch selectively establishes a current through the source of current supply and one of said relays upon closure of the switch with the respective contact energizing said relay for actuating the respective switches in the light circuit, a holding circuit closed by movement of one of said switches for maintaining energization of the relay, a current interrupter flasher means, a load circuit, contacts engageable upon movement of said relay actuated switches for connecting light circuit and load circuit in parallel and said flasher in series with the parallel circuit for intermittently energizing one of the lights on the front and one of the lights on the back of the vehicle, said lights being on the same side of said vehicle to indicate an intended turn in the direction corresponding to the side of the vehicle on which the energized lights are located, a normally closed switch in the holding circuit, said switch having an element connected to the current supply and contacts on each side of said element connected to the respective relays, a cam movable with the steering mechanism engageable with the normally closed switch element for separating said element in the normally closed switch from one of the contacts interrupting the holding circuit only when the steering mechanism is turned in the direction opposite to that indicated by the flashing signals, the interruption of the holding circuits permitting the relay actuated switches to return to normal position and discontinue the flashing signals, and means actuated by the relay for connecting the highway beam signal in the vehicle in parallel circuit with the energized lights.

3. A signal system comprising, a vehicle having a steering mechanism including a steering shaft, a switch housing mounted adjacent to the steering shaft, a flexible switch element in said housing and extending therefrom toward the steering shaft, a source of current supply, a conductor connecting the current supply and switch element, flexible contacts in the housing engaging the respective sides of the switch element, said contacts being shorter than the switch element, signal lights on the vehicle, means including electro-responsive devices for selectively establishing a current to the lights on a side of said vehicle to signal an intended turn in the direction corresponding to the side of the vehicle on which the energized lights are located, a current interrupter flasher means in circuit with the signal lights to intermittently break the circuit to the signal lights, holding circuits for said electro-responsive devices for maintaining current to said flasher in the signal light circuit, conductors connecting a holding circuit to each of the flexible contacts, and means on the steering shaft adapted to engage said elements upon rotative movement of said shaft, movement in one direction maintaining engagement of the switch element and the contact of the energized circuit and movement in the other direction separating said element and contact for interrupting the holding circuit, de-energizing the electro-responsive device and discontinuing the signal.

RAYMOND V. NORTH.

REFERENCES CITED

The following references are of record in the file of this patent:

UNITED STATES PATENTS

| Number | Name | Date |
|---|---|---|
| 1,634,347 | Tockwin | July 5, 1927 |
| 1,647,663 | Pollock | Nov. 1, 1927 |
| 1,889,551 | Hollins et al. | Nov. 29, 1932 |
| 1,973,299 | Swartwout | Sept. 11, 1934 |
| 2,064,735 | Curtiss | Dec. 15, 1936 |
| 2,086,959 | Rom | July 13, 1937 |
| 2,122,508 | Bell | July 5, 1938 |
| 2,268,545 | Crider | Jan. 6, 1942 |